No. 677,162. Patented June 25, 1901.
J. C. WINTERS.
APPARATUS FOR COOKING CANNED FOOD.
(Application filed June 22, 1900.)
(No Model.) 2 Sheets—Sheet 1.
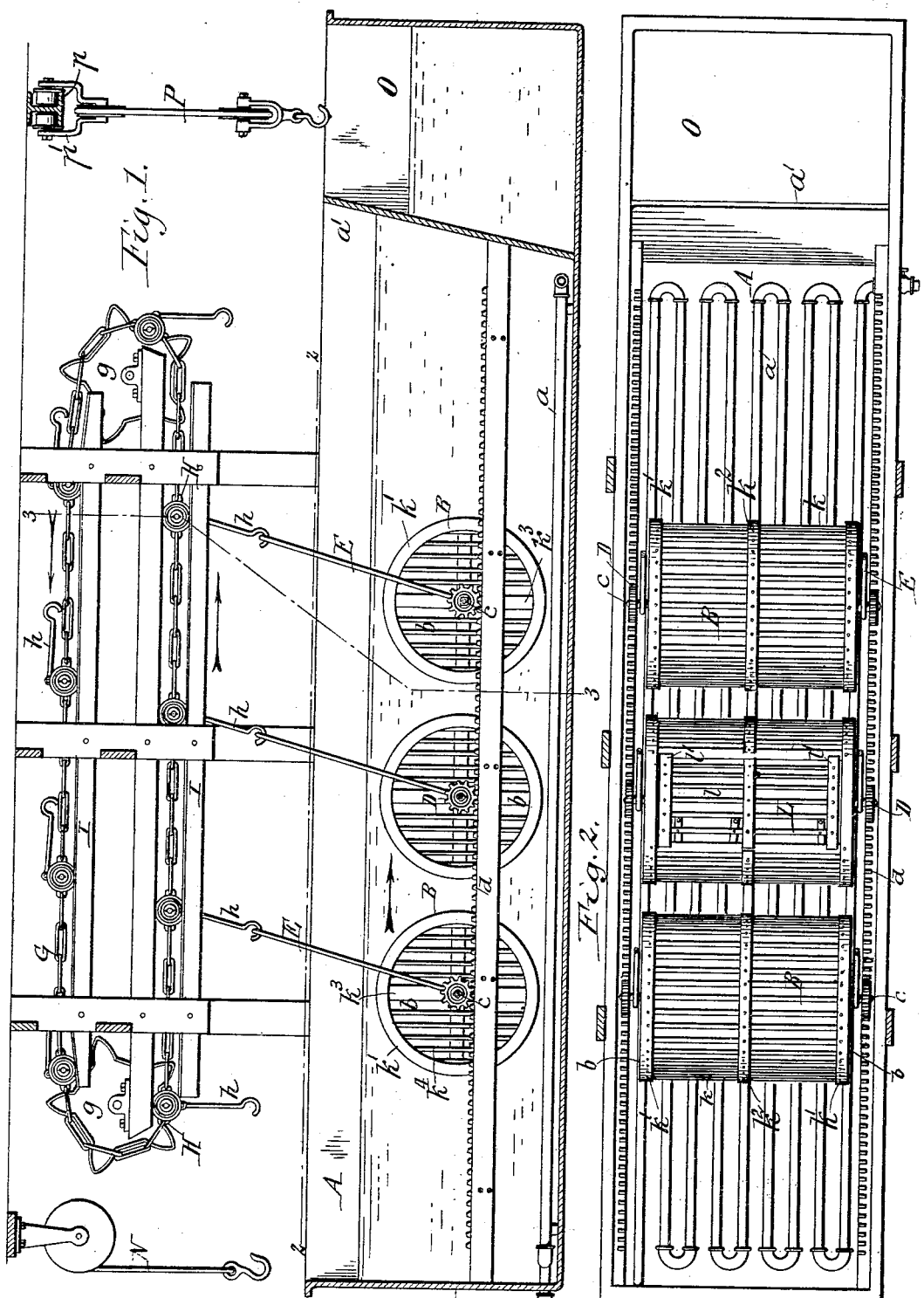

No. 677,162. Patented June 25, 1901.
J. C. WINTERS.
APPARATUS FOR COOKING CANNED FOOD.
(Application filed June 22, 1900.)
(No Model.) 2 Sheets—Sheet 2.
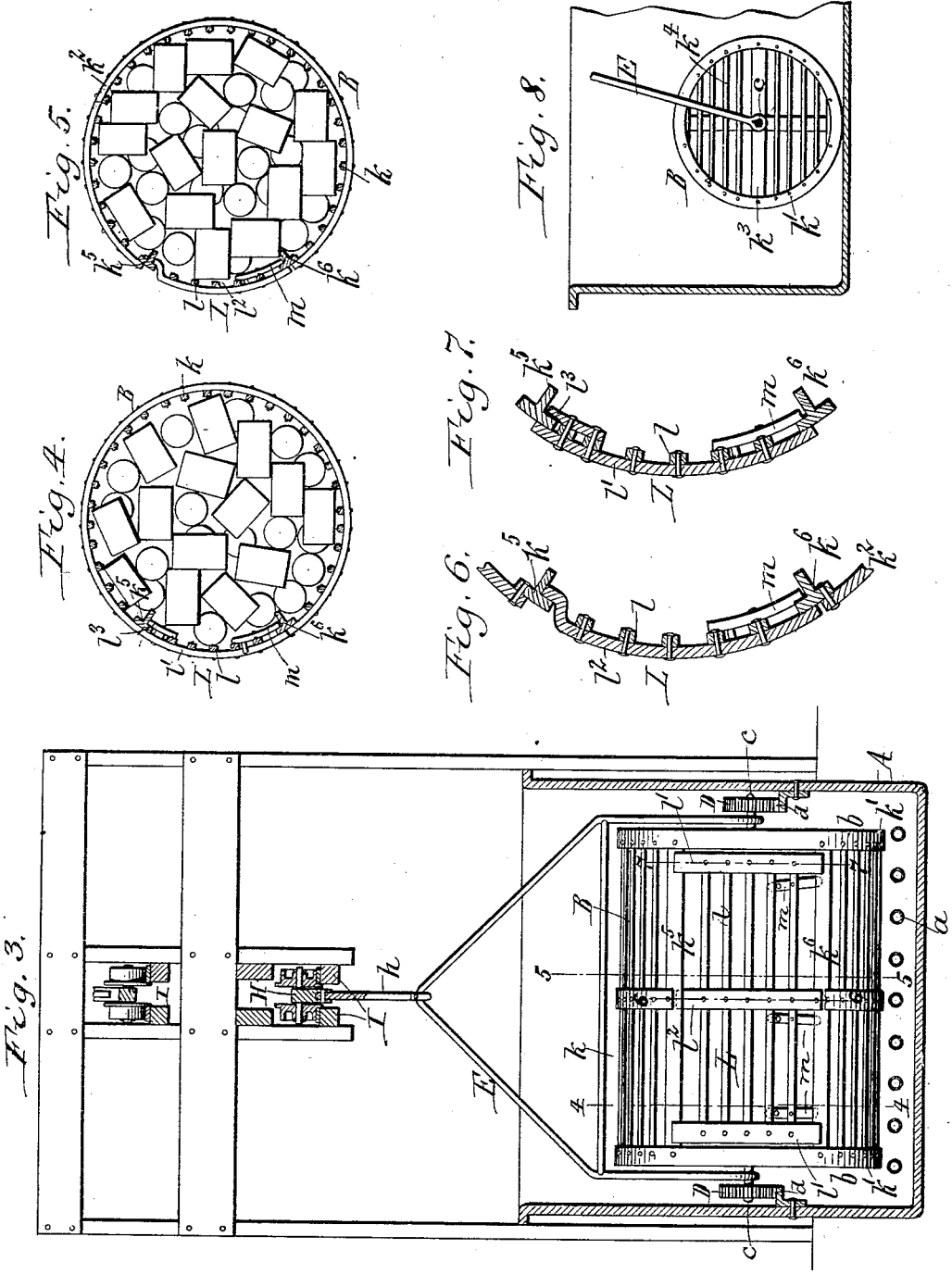

UNITED STATES PATENT OFFICE.

JOHN C. WINTERS, OF MOUNT MORRIS, NEW YORK.

APPARATUS FOR COOKING CANNED FOOD.

SPECIFICATION forming part of Letters Patent No. 677,162, dated June 25, 1901.

Application filed June 22, 1900. Serial No. 21,151. (No model.)

*To all whom it may concern:*

Be it known that I, JOHN C. WINTERS, a citizen of the United States, residing at Mount Morris, in the county of Livingston and State of New York, have invented new and useful Improvements in Apparatus for Cooking Canned Food, of which the following is a specification.

This invention relates to that class of apparatus which is employed in canning-factories for cooking or processing the canned goods after the cans have been capped. In order to effect a thorough and uniform cooking of the food in the cans, it is necessary that the position of the cans should be frequently changed while being cooked or processed, as otherwise the inner portion of the body of food in each can is not acted upon by the heat as much as the outer portion. When this occurs, there is danger of an insufficient cooking of the inner portion of the food, resulting frequently in the decomposition or fermentation and consequent spoiling of the contents. Various means have been resorted to or proposed in such processing apparatus for changing the position of the cans while being cooked or processed.

The object of my invention is to produce an apparatus of this character that is very simple in construction, easy of manipulation, and which effects a continuous change in the position of the cans while the latter are treated in a very simple and satisfactory way, thereby effecting a thorough and uniform cooking of the contents of the cans in a comparatively short time and avoiding all danger of loss by unequal cooking of the contents and the decomposition or fermentation resulting therefrom.

In the accompanying drawings, Figure 1 is a longitudinal sectional elevation of my improved cooking apparatus, showing the apparatus greatly reduced in length for sake of clearness. Fig. 2 is a sectional top plan view of the same, the section being taken in line 2 2, Fig. 1. Fig. 3 is a vertical transverse section, on an enlarged scale, in line 3 3, Fig. 1. Figs. 4 and 5 are cross-sections through the crate in lines 4 4 and 5 5, Fig. 3, respectively. Figs. 6 and 7 are cross-sections through the door of the crate, on an enlarged scale, in lines 6 6 and 7 7, Fig. 3, respectively. Fig. 8 is a fragmentary sectional elevation of the cooling-tank in which the cans are cooled after having been cooked.

Like letters of reference refer to like parts in the several figures.

A represents the horizontal cooking or processing tank or vat, which contains the liquid in which the cans are cooked or processed and which is preferably made of such length that the operation of cooking or preserving is completed by moving the cans once through this tank or vat. The tank is provided with any suitable device for heating the liquid— for instance, a steam-coil $a$, arranged on the bottom of the tank.

B represents crates or cages, which receive the cans to be treated and which are of such size that when placed in the tank they are immersed in the boiling liquid contained therein. These crates or cages are of skeleton construction, so that the liquid enters the crates and fills the interstices between the cans contained in the same. These crates containing the cans are moved slowly through the tank from one end to the other, and they are so constructed that they move through the tank by a rolling movement. As shown in the drawings, the crates are of cylindrical form and have flat heads $b$, which are provided with laterally-projecting journals or stub-axles $c$. D represents toothed wheels, which are secured to these axles and run upon rack-bars $d$, secured horizontally to the inner sides of the side walls of the tank. The rack-bars are arranged at such a height above the bottom of the tank that the crates clear the bottom and roll freely on these bars.

E is a bail which is connected with the two stub-axles on opposite sides of the crate and by which the latter is drawn through the tank. Any suitable mechanism may be employed for this purpose.

The propelling mechanism shown in the drawings is constructed as follows: G represents an endless traveling chain arranged lengthwise over the tank and running around sprocket-wheels $g$ $g$. H represents roller-carriages secured to this chain at suitable intervals and each carrying a depending hook $h$, which is engaged with the bail of one of the crates. I I represent upper and lower tracks on which the roller-carriages run between the sprocket-wheels. The two rails of each track are arranged at such a distance apart that the hooks depend from the carriages between the rails of the lower track.

The can crates or cages are preferably constructed as follows: $k$ represents longitudinal bars, which are secured at their ends to rings $k'$ in the form of a cylinder and are connected at the middle by a band $k^2$. $k^3 k^4$ represent parallel bars, which form the flat heads of the crate and which are secured to the rings $k'$. The central bar $k^3$ of each head is made somewhat wider or stronger than the rest and carries the journal $c$. The cylindrical wall of the crate is provided with an opening of suitable size for the promiscuous introduction and removal of the cans. This opening is formed between strong longitudinal bars $k^5 k^6$, preferably of T form, and is closed by a removable door L, Figs. 3 to 7. This door is composed of longitudinal bars $l$, arranged in the form of a cylinder-segment, which completes the cylindrical wall of the crate, and curved connecting cross-bars $l' l^2$. The bars $l'$ are arranged adjacent to the rings $k'$, and the central bar $l^2$ is arranged in line with the central band $k^2$ of the crate. The end cross-bars $l'$ of the door L bear against the outer side of one of the bars $k^5 k^6$ of the door-opening and are provided at one edge of the door and on the inner side of the latter with short bars $l^3$, which engage against the inner side of the bar $k^5$, so that the bars $l'$ and $l^3$ straddle the bar $k^5$. The fit of these parts is sufficiently loose to allow the door to be connected with and removed from the bar $k^5$ by a combined sliding and swinging movement. The middle cross-bar $l^2$ is preferably so bent at the same edge of the door that it engages against the inner side of the bar $k^5$. This door is provided at its opposite edge with turn-buttons $m$, which engage against the inner side of the adjacent bar $k^6$ for securing the door in the opening of the crate. This attachment of the door to the crate leaves the cylindrical surface of the create without projecting parts and enables the crate to be freely rolled about in moving it to and from the tank and through the tank. The bars and rings of the crate or cage are preferably made of iron or steel.

N represents a hoisting device, of any suitable construction, arranged over the front end of the tank for hoisting the crates over the edge of the tank and then lowering the crates into the tank.

O represents a rinsing-compartment arranged at the rear end of the tank and separated therefrom by the rear wall of the tank. P represents a hoisting device arranged over this rinsing-compartment and mounted upon a transverse track $p$ by means of a roller-carriage $p'$, so that the crate carried on this hoisting device can be moved off to one side of the cooking-tank.

In the operation of my improved apparatus the tank is kept filled to a suitable height with the boiling liquid in which the cans are cooked or processed. This liquid is preferably a saline solution of the usual kind which permits the temperature to be raised above the boiling-point of water. Such a solution is specifically heavy and causes a buoyancy of the filled crates which materially relieves the weight of the crates resting on the supporting-wheels and rack-bars. The crates are filled with cans indiscriminately, no definite order or arrangement being necessary, and the filled crates are introduced into the tank at the front end thereof one after another and connected with the propelling-chain as the hooks of the latter reach the front end of the tank. The crates are moved by the chain slowly through the tank, and in passing through the tank the crates roll on their supports. When the crates roll on a circular surface which is smaller in diameter than the crates, as on the toothed wheels which roll on the gear-racks, their relative movement is correspondingly greater than when they roll on their cylindrical surface; but the latter plan may be adopted, as shown in Fig. 8. The rolling movement of the crates causes a frequent change in the position of the cans during the operation of cooking or processing, whereby the contents of the cans are shifted about and the inner portions of the contents are caused to exchange position with the outer portions. This establishes a circulation or movement in the contents of each can, whereby the heat is distributed or diffused throughout the contents of each can and the contents are uniformly cooked. As each crate reaches the rear end of the tank it is disconnected from the propelling mechanism and hoisted out of the tank and lowered into the rinsing-compartment O, which is kept supplied with water. The crates and cans are rinsed in this compartment and freed from the adhering solution. As the solution in the tank becomes concentrated by evaporation it is replenished from the rinsing-compartment, whereby the solution which is removed from the crates and cans in the rinsing-compartment is returned to the tank, while the rinsing-compartment is replenished by the addition of fresh water. The rear wall $a'$ of the cooking-tank is preferably inclined to facilitate the transfer of the crates from the cooking-tank to the rinsing-compartment. The rinsed crate is then hoisted out of the rinsing-compartment and removed to a cooling-tank which is similar to the cooking-tank and provided with a similar propelling apparatus. The cooking-tank is supplied with cold water and is not provided with any heating apparatus. In this cooling-tank the crates can roll on their cylindrical surface directly on the bottom of the tank, as illustrated in Fig. 8.

The intermeshing teeth of the wheels and supporting-racks hold both heads or ends of each crate in alinement across the tank and prevent the crates from running to one side; but these teeth may be omitted, if desired.

I claim as my invention—

1. The combination with a treating-tank having a longitudinal support for rolling a can-crate thereon, of a rolling can-crate adapted to receive the cans to be treated and capable of a rotary and advancing movement on said support, and means for rolling the crate through said tank on said support, substantially as set forth.

2. The combination with a treating-tank having a longitudinal support for rolling a can-crate thereon, of a rolling can-crate adapted to receive the cans to be treated and capable of rolling on said support, and a propelling mechanism arranged lengthwise of said tank and adapted to be connected with said crate for moving the same through said tank with a rotary and advancing movement, substantially as set forth.

3. The combination with a rolling crate which is adapted to receive the cans to be treated and provided at its sides with journals, of a treating-tank provided with a longitudinal support on which the crate rolls in moving through the tank, and a propelling mechanism arranged lengthwise of the tank and provided with means for connecting it with the journals of the crate, whereby the crate is moved through the tank with a rotary and advancing movement, substantially as set forth.

4. The combination with a can-crate provided with journals, of a treating-tank provided with a longitudinal support on which the crate is rolled in moving through the tank, a bail connected with said journals, and an endless propelling device arranged lengthwise over said tank and provided with a hook for connecting the propelling device with said bail, substantially as set forth.

5. The combination with a crate adapted to receive the cans to be treated and capable of rotary movement about its axis, of supporting-wheels applied to the sides of said crate concentric with its axis, a treating-tank provided with a longitudinal track on which said wheels roll in rolling the crate through said tank, and means for rolling the crate through the tank, substantially as set forth.

6. The combination with a crate adapted to receive the cans to be treated and capable of rotary movement about its axis, of toothed supporting-wheels applied to the sides of said crate concentric with its axis, a treating-tank provided with longitudinal toothed bars with which said wheels mesh, and means for rolling the crate through the tank, substantially as set forth.

7. The combination with a treating-tank, of a cylindrical can-crate provided in its peripheral face with an opening for the introduction and removal of the cans and with a door for closing said opening, and means for rolling said crate through said tank, substantially as set forth.

Witness my hand this 19th day of June, 1900.

JOHN C. WINTERS.

Witnesses:
C. F. BRAMAN, Jr.,
F. E. WAKEMAN.